(12) United States Patent
Wong (10) Patent No.: US 10,121,626 B2
(45) Date of Patent: Nov. 6, 2018

(54) ELECTRICAL SWITCH UNIT FOR AN ELECTRICAL DEVICE

(71) Applicants: DONGGUAN CHEN DA APPLIANCE CO. LTD., Dongguan (CN); DEFOND COMPONENTS LIMITED, Hong Kong (HK)

(72) Inventor: Wai Man Wong, Hong Kong (HK)

(73) Assignees: DEFOND ELECTECH CO. LTD, Dongguan (CN); DEFOND COMPONENTS LIMITED, Hong Kong (CN)

( * ) Notice: Subject to any disclaimer, the term of this patent is extended or adjusted under 35 U.S.C. 154(b) by 0 days.

(21) Appl. No.: 15/697,734

(22) Filed: Sep. 7, 2017

(65) Prior Publication Data

US 2018/0096813 A1 Apr. 5, 2018

(30) Foreign Application Priority Data

Sep. 30, 2016 (HK) .................................. 16111469.1

(51) Int. Cl.
*H01H 73/04* (2006.01)
*H01H 3/04* (2006.01)
(Continued)

(52) U.S. Cl.
CPC ............ *H01H 73/045* (2013.01); *H01H 1/20* (2013.01); *H01H 3/04* (2013.01); *H01H 3/38* (2013.01); *H01H 3/46* (2013.01); *H02H 3/08* (2013.01)

(58) Field of Classification Search
CPC .......... H01H 73/045; H01H 1/20; H01H 3/04; H01H 3/38; H01H 3/46; H01H 15/102; H01H 9/061; H02H 3/08
(Continued)

(56) References Cited

U.S. PATENT DOCUMENTS 4,286,125 A 8/1981 Schäffeler et al.
6,124,556 A * 9/2000 Thalhammer ........ H01H 13/023
200/16 R
(Continued)

FOREIGN PATENT DOCUMENTS

CN 102270552 A 12/2011
CN 103137360 A 6/2013
(Continued)

OTHER PUBLICATIONS

Chinese Search Report dated Dec. 7, 2016 for corresponding Hong Kong Application No. 16111469.1, 4 pages. (Translation not available).
(Continued)

*Primary Examiner* — Edwin A. Leon
(74) *Attorney, Agent, or Firm* — Seed IP Law Group LLP (57) ABSTRACT

An electrical switch includes a fixed electrical contact; a movable electrical contact which is moveable relative to thereto between an ON position in contact with and, an OFF position out of contact with, the fixed electrical contact; a contact mover movably coupled to a terminal member moveable relative thereto so as to move the movable electrical contact between the ON and OFF positions; a biasing member coupling the contact mover and the terminal member together such that said biasing member acts upon the contact mover as the contact mover moves the movable electrical contact relative to the fixed electrical contact between the ON and OFF positions; wherein in the ON position, electrical current flows along a path comprising the terminal member, contact mover and movable electrical contact in series, and, an electrical insulation member arranged in series with the biasing member between the contact mover and the terminal member.

14 Claims, 6 Drawing Sheets

(51) Int. Cl.
*H01H 3/46* (2006.01)
*H01H 1/20* (2006.01)
*H01H 3/38* (2006.01)
*H02H 3/08* (2006.01)

(58) Field of Classification Search
USPC .............................. 200/244, 6 B, 522, 533
See application file for complete search history.

(56) References Cited

U.S. PATENT DOCUMENTS

| 6,433,291 B1 * | 8/2002 | Mori ..................... H01H 5/14 |
| | | 200/434 |
| 7,705,260 B2 * | 4/2010 | Xu ..................... H01H 1/5833 |
| | | 200/43.17 |

FOREIGN PATENT DOCUMENTS

| EP | 0 339 131 A2 | 11/1989 |
| GB | 1053936 | 1/1967 |

OTHER PUBLICATIONS

German Office Action, dated Jan. 31, 2018, for German Application No. 10 2017 114 227.4, 6 pages (no English translation provided).

* cited by examiner

*FIG. 1*

*PRIOR ART*

FIG. 2

PRIOR ART

*FIG. 3*

*PRIOR ART*

ELECTRICAL SWITCH UNIT FOR AN ELECTRICAL DEVICE

TECHNICAL FIELD

The present invention relates to the field of electrical switch units for use in electrical devices such as power tools, gardening tools and so on.

BACKGROUND OF THE INVENTION

Electrical devices, such as for instance power tools and gardening tools, include electrical switch units which control the flow of current from a power source to power the electrical device. However, the amount of power that is able to be supplied from the power source to power the electrical device is constrained by the current capability of conventional electrical switch unit assemblies. Accordingly, there is a perceived need to improve the current capability of electrical switch units so that more powerful electrical devices may be provided for consumers to utilise across a wide range of applications, as well as providing ease assembly and pre-testing of such devices.

SUMMARY OF THE INVENTION

The present invention seeks to alleviate at least one of the above-described problems.

The present invention may involve several broad forms. Embodiments of the present invention may include one or any combination of the different broad forms herein described.

In a first broad form, the present invention provides an electrical switch unit for use in an electrical device to control flow of electrical current therethrough from a power source to power the electrical device, the electrical switch unit comprising: a fixed electrical contact and a movable electrical contact, said movable electrical contact being configured for movement relative to the fixed electrical contact between an ON position in which the movable electrical contact is in contact with the fixed electrical contact wherein electrical current is able to flow from the power source therethrough to power the electrical device, and, an OFF position in which the movable electrical contact is out of contact with the fixed electrical contact wherein electrical current from the power source is not able to flow from the power source therethrough to power the electrical device; a contact mover movably coupled to a terminal member, the contact mover being configured for movement relative to the terminal member so as to move the movable electrical contact between the ON position and the OFF position; and a biasing member coupling the contact mover and the terminal member together such that said biasing member is configured to act upon the contact mover as the contact mover moves the movable electrical contact relative to the fixed electrical contact between the ON position and the OFF position; wherein when the movable electrical contact is arranged in the ON position, electrical current is able to flow along an electrical current path comprising the terminal member, the contact mover and the movable electrical contact in series, and, wherein an electrical insulation member is arranged in series with the biasing member between the contact mover and the terminal member whereby said electrical insulation member electrically insulates the biasing member from electrical current flow therethrough when the movable electrical contact is arranged in the ON position.

Preferably, the electrical insulation member may include an electrically-insulative material such as plastic (e.g. a glass fibre nylon material).

Preferably, the biasing member may include an elastic biasing member. Also preferably, the elastic biasing member may include at least one of a compression coil spring, a tension coil spring and a torsion coil spring.

Preferably, a first end of the biasing member may be coupled to the contact mover and a second end of the biasing member may be coupled to the terminal member via the electrical insulation member.

Preferably, the electrical insulation member may be configured to protrude from the terminal member.

Preferably, the contact mover may include a lever that may be pivotably movable relative to the terminal member.

Preferably, the movable electrical contact may include an electrically-conductive material such as a copper alloy material.

Preferably, the present invention may include a plurality of movable electrical contact members that may be movable by at least one contact mover between ON positions and OFF positions.

Preferably, the present invention may include an operable actuator mechanism for actuating movement of the contact mover relative to the terminal member.

Preferably, the electrical insulation member and the terminal member may be pre-assembled together so that contact force may be tested before installing the pre-assembly into the switch housing. Also preferably, the electrical insulation member may be co-molded with the terminal member as one solid one piece in seeking to eliminate the clearance between the electrical insulation member and terminal member.

In another broad form, the present invention provides an electrical device comprising an electrical switch unit in accordance with any one of the aspects of the first broad form of the present invention described herein. Typically, the electrical device may include an electrically-operable appliance such as a electrical power tool or an electrical gardening tool.

BRIEF DESCRIPTION OF THE DRAWINGS

The present invention will become more fully understood from the following detailed description of a preferred but non-limiting embodiments thereof, described in connection with the accompanying drawings, wherein.

DETAILED DESCRIPTION OF THE PREFERRED EMBODIMENTS

An embodiment of the present invention will now be described herein with reference to FIGS. 1 to 6 wherein the embodiment comprises an electrical switch unit configured for use in controlling supply of electrical current to drive an electrical power tool such as an electric drill, grinder, sander, saw, rotary driving tool or any other power tool, gardening tool or electrical device. It would be appreciated and understood that whilst this embodiment is described for use in an electrical power tool, this is merely for the purpose of illustrating the functional operation of the electrical switch unit and in alternate embodiments the switch unit may of course be used in different types of electrical devices such as gardening tools, office equipment such as documents shredders and so on.

In this exemplary embodiment, the power tool will also include a trigger actuator mechanism that is spring-loaded by an actuation spring and which is operable by a user directly or indirectly to actuate movement of the electrical switch unit between ON and OFF positions. In this embodiment, the actuation spring of the actuator mechanism is configured to bias the actuator mechanism into a position whereby the electrical switch to which the actuator mechanism is operably connected, is arranged in the OFF position by default. The actuator mechanism includes a molded plastic chassis that is mounted internally of a body of the power tool adjacent to a handle of the power tool. The spring-loaded actuator mechanism is suitably mounted to the chassis so as to be linearly slidable in to and out of a corresponding recess of the chassis when operated by the user. A switchbox housing (not shown) is disposed adjacent the actuator mechanism chassis and configured for housing the various parts of the electrical switch unit assembly the operation of which will be described in greater detail in the following text. The switchbox housing will be suitably moulded from a plastic or metal material and includes an internal surface shape profile configured to allow mounting of various parts of the electrical switch unit. For instance, the internal surface of the switchbox housing may include pre-moulded slots or recesses configured for receiving various switch components such as terminal members and so on therein. The switchbox housing may also include at least one apertures in a wall via which the actuator mechanism or an intermediate part operably connected to the actuator mechanism may mechanically communicate therethrough in order to actuate movement of the electrical switch unit.

Figure 1:
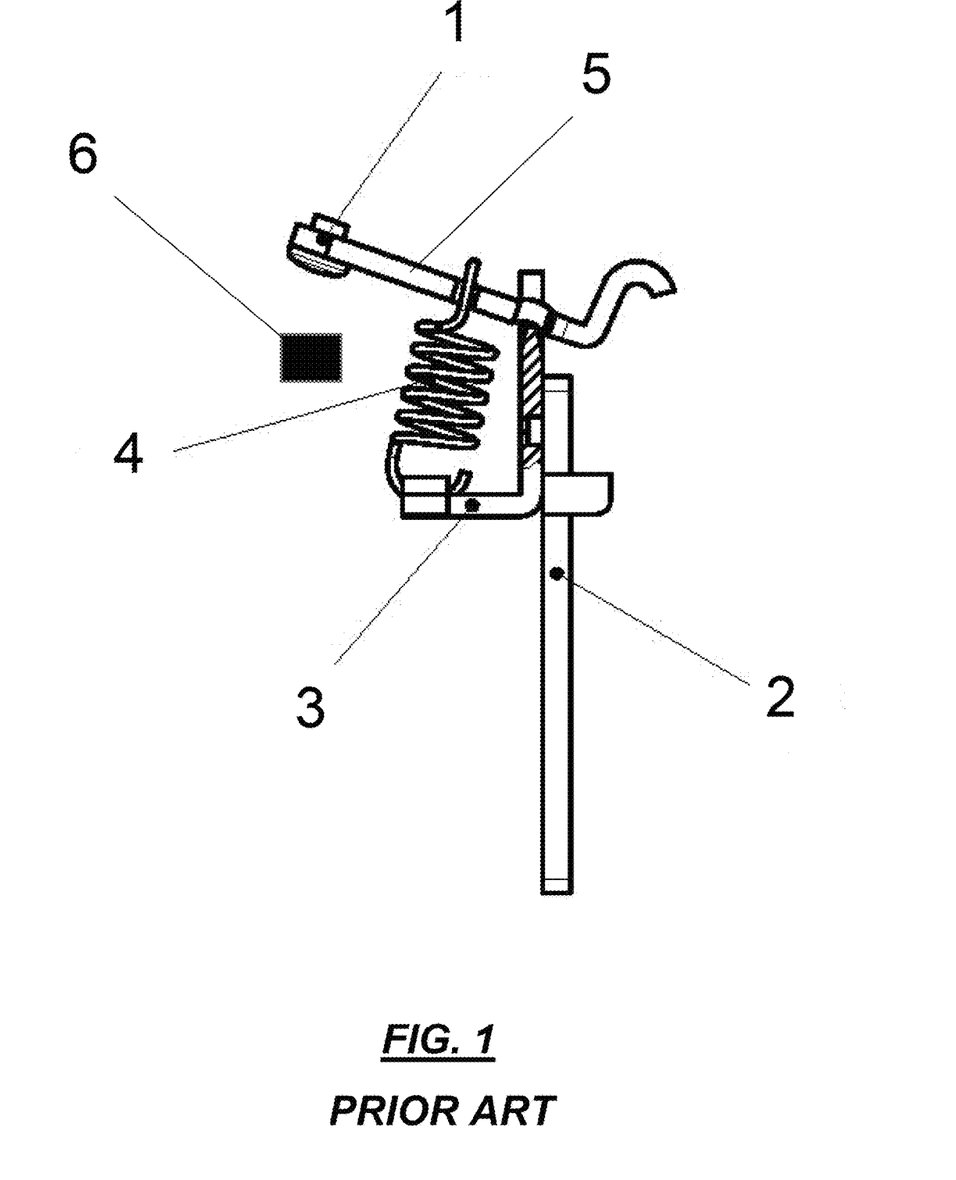
FIG. 1 depicts a side-view of a configuration for an electrical switch unit used in certain electrical appliances such as electrical power tools or electrical gardening tools.

Before describing the novel improvement of the embodiment of the present invention over existing technology, the structure and operation of an electrical switch unit will first be described with reference to FIGS. 1 to 3. Referring firstly to FIG. 1, an electrical switch unit is shown which is configured for controlling supply of current from an AC or DC power source to a motor of the power tool in order to power the motor. The electrical switch unit includes at least one fixed electrical contact (6) and at least one movable electrical contact (1) whereby the movable electrical contact (1) is configured for movement relative to the fixed electrical contact (6) between an ON position in which the movable electrical contact (1) is in contact with the fixed electrical contact (6) to effect a closed circuit electrical path between the power source and the motor, and, an OFF position in which the movable electrical contact (1) is arranged out of contact with the fixed electrical contact (6) so as to open the electrical circuit path between the power source and the motor to shut off operation of the motor. The movable electrical contact (1) is disposed on the end of and in electrical communication with a lever (5) which is pivotably coupled to a lever frame (3) (e.g. of a copper alloy material) so as to be pivotably movable to arrange the movable electrical contact (1) between the ON and OFF positions. The lever frame (3) is coupled to an elongate terminal member (2) which is in turn rigidly secured to an internal surface of the switchbox housing of the power tool. In this embodiment, a plurality of movable electrical contacts (1) are disposed on the lever (5) which are movable relative to corresponding fixed electrical contacts (6) of the electrical switch unit. The plurality of movable electrical contacts (1) cannot all be seen in the side-view of FIGS. 1 and 2, but would be understood to extend into the page as would the corresponding fixed electrical contacts (6). In this embodiment, both the fixed electrical contacts (6) and the movable electrical contacts (1) are formed from a copper alloy material with or without plating which may ensure good electrical contact after repeated operation of the switching unit and alleviates sparking.

A biasing member (4) is located between the lever (5) and the lever frame (3) which is configured to act against the lever (5) in a manner which suitably positions the lever (5) during operation of the electrical switch unit between ON and OFF positions. In embodiments of the present invention, the biasing member (4) may include an elastic member such as a tension coil spring (4) or even an elastic pad. The tension coil spring (4) includes a linear helical configuration having a linear axis so that the tension coil spring (4) may generally move in linear motion along the linear axis when it undergoes expansion and compression. The first end of the tension coil spring (4) is coupled to the lever (5) (for instance by hooking an end of the coil spring (4) around a notch disposed on a surface of the lever) whilst a second end of the coil spring (4) is coupled to the lever frame (3) (for instance by hooking an opposing end of the coil spring (4) around a notch disposed on a surface on the lever frame (3)). The tension coil spring (4) in this conventional-type configuration may urge the lever (5) into a default ON position. In alternate embodiments, a compression coil spring may be utilised which would be adapted to move the lever (5) and movable electrical contacts (1) disposed thereon in to a default OFF position. The use of a compression coil spring is not the most preferable choice as this may generally require guide rails to keep the compression spring housed properly when it is in an expanded configuration. It is conceivable that in yet other embodiments of the present invention, the coil spring may be substituted with any other suitable resilient means such as for instance a spring lever, an elbow spring, an elastic pad-like material and so on.

Figure 2:
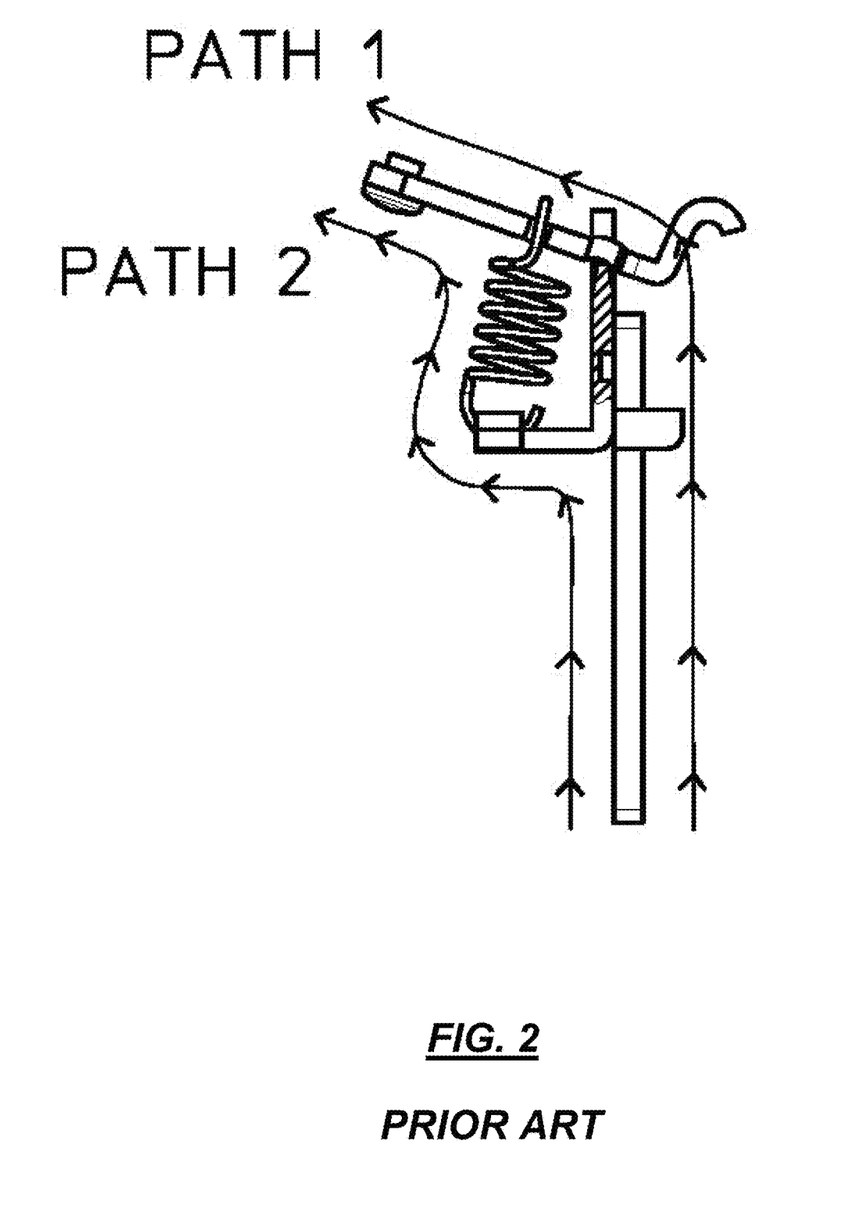
FIG. 2 depicts a primary current flow path through an electrical switch unit configuration without insulation (PATH 1) in side-view, and, a secondary current flow path which passes through the spring member (PATH 2) of the electrical switch unit.

Referring now to FIG. 2, in the switch unit assembly, when the movable electrical contacts (1) are arranged in the ON position, current from the power source will flow along a primary current path which includes the terminal member (2), a portion of the lever frame (3) and the lever (5) in series toward the motor. Each of the terminal member (2), the lever (5), and the lever frame (3) will be formed from a conductive metal material such as copper alloy or any other suitably conductive material to facilitate current flow. However, in this conventional-type configuration, whilst the coil spring (4) will be configured to have relatively high resistance properties, some electrical current from the power source will still flow along a secondary current path of the electrical switch unit (in parallel with the primary current path) comprising the terminal member (2), a portion of the lever frame (3), the coil spring (4), and the lever (5) in series. Typically, the amount of current that is drawn through the primary current path compared to the secondary current path may be apportioned in a ratio of around 100~200:1 such that a current of less than 1 Amp may typically pass through the secondary current path for a power tool typically drawing a steady state current of 20-30 Amps in total through the electrical switch unit. Furthermore, the current drawn through the electrical switch unit may spike considerably in a conventional electrical switch unit, for instance as a result of startup torque when operating an electric drill, whereby a current of 150-200 Amps in total may conceivably be drawn through the conventional electrical switch unit resulting in current flow of well over 1 Amps through the biasing member (4) in the secondary current path during such operating conditions. It would be appreciated that by virtue of the parallel nature of the primary current path and secondary current path (comprising the coil spring) in a conventional electrical switch unit, the overall current capability of the electrical switch (and hence overall power capability of the power tool) is constrained by the current loading capacity of the coil spring in the secondary current path, which is susceptible to degradation if overloaded.

Figure 3:
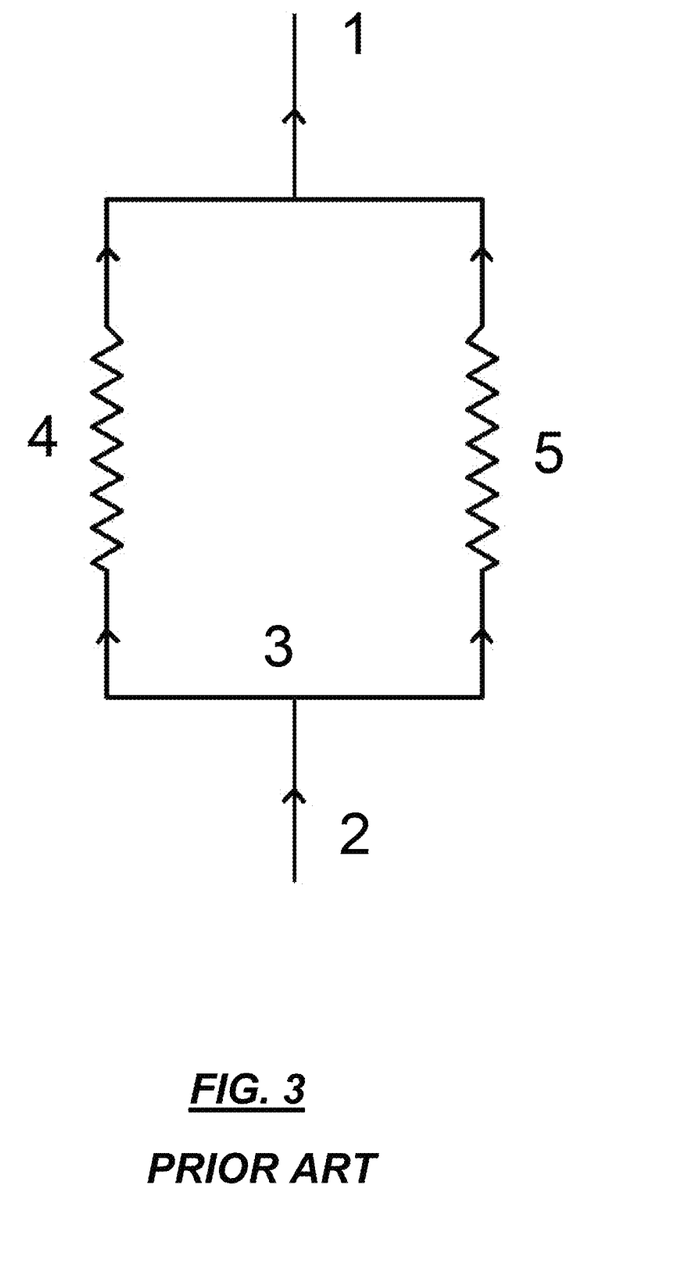
FIG. 3 an electrical circuit representation of the electrical switch unit of FIG. 1.

FIG. 3 depicts a circuit diagram representation of the electrical switch unit discussed above in which the primary current path includes the terminal member (2), the lever frame (3) and the lever (5) whilst the secondary current path (PATH 2) includes the terminal member (2), the lever frame (3), the coil spring (4) and the lever (5). The resistance represented by the resistor symbol in the secondary current path is predominantly provided by the inherent resistance in the coil spring (4).

Figure 4:
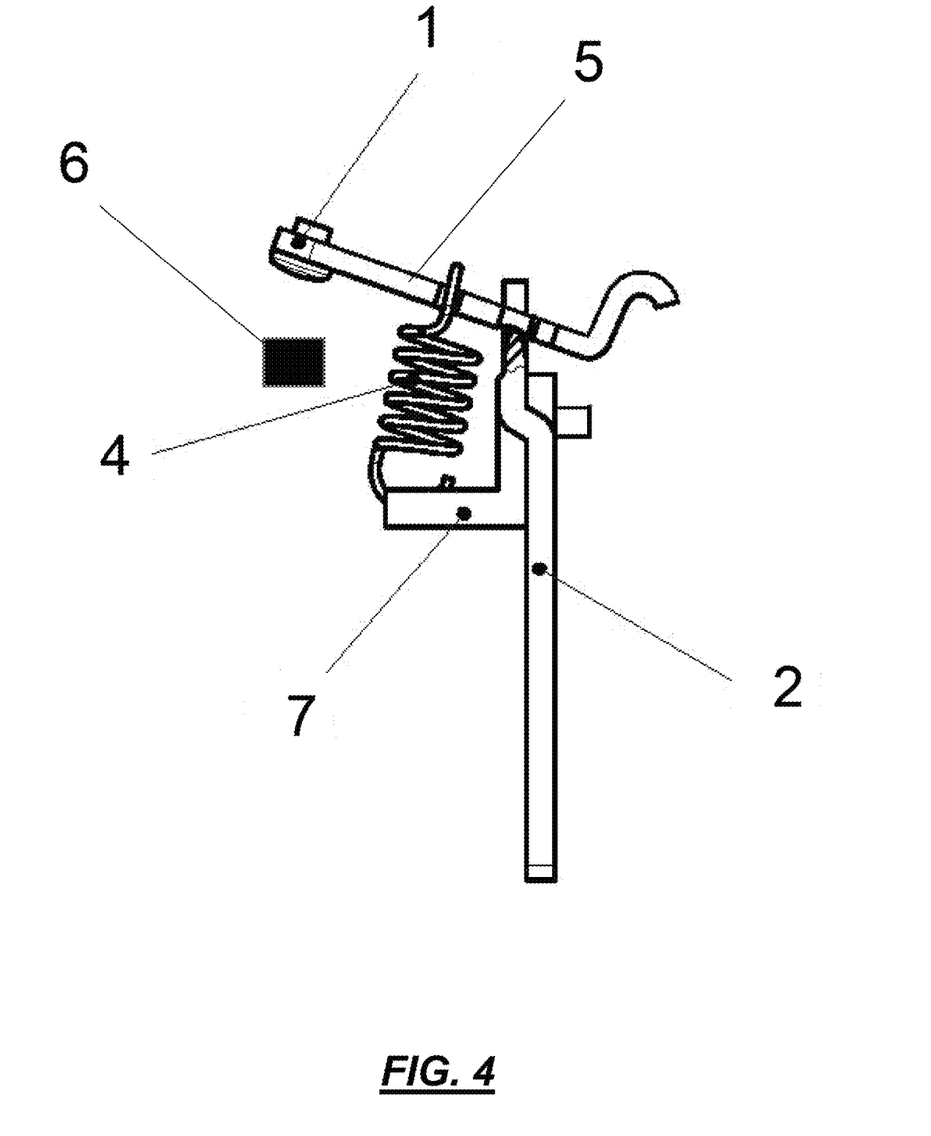
FIG. 4 depicts a side-view of a novel electrical switch unit for use in an electrical power tool in accordance with an embodiment of the present invention.
Figure 5:
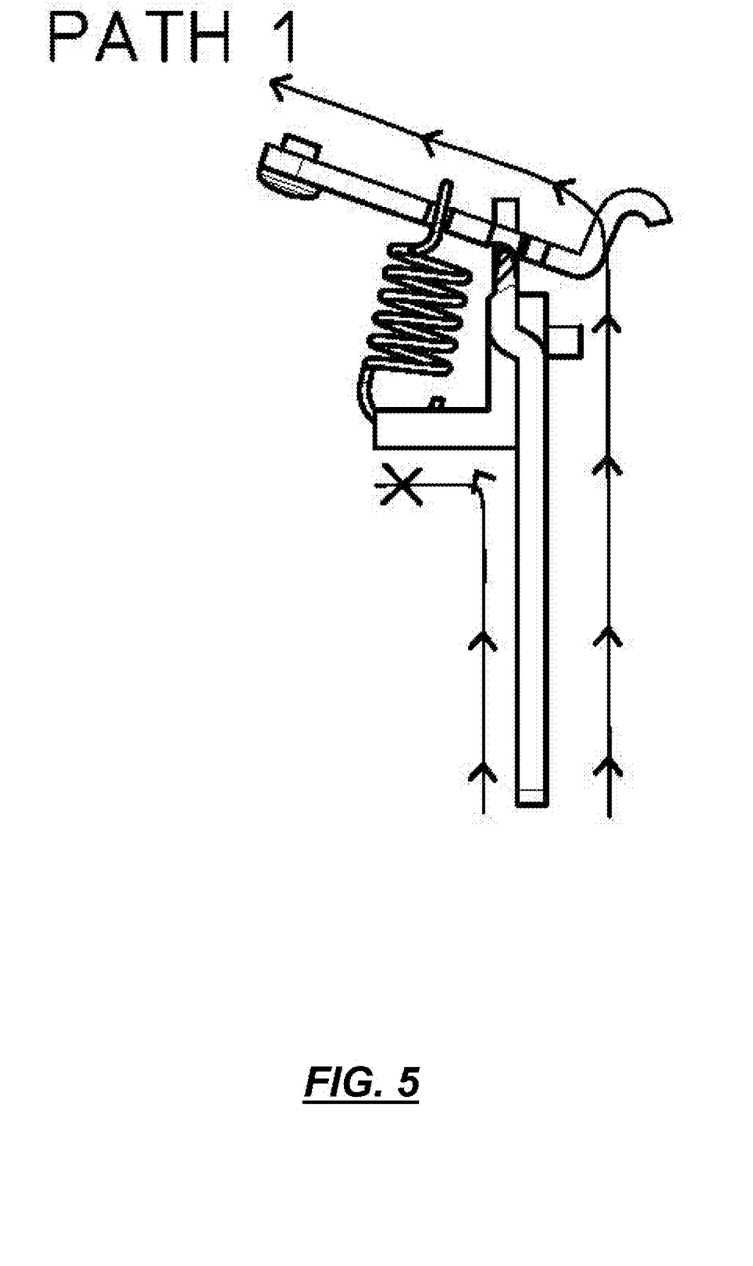
FIG. 5 depicts an electrical current flow path through the novel electrical switch unit embodiment depicted in FIG. 4.

Turning now to FIG. 4, a novel electrical switch unit of this embodiment is shown which alleviates aforementioned deficiencies associated with the electrical switch units. For simplicity, the same reference numerals will be used in respect of parts of the novel electrical switch unit that are assigned to common parts of the electrical switch unit described above. In this exemplary embodiment of the present invention, an electrical switch unit is provided which differs from the switch unit configuration described above in that the lever (5) is pivotably mounted directly on to the terminal member (2) as shown in FIG. 4. Also, the biasing member (4) has one end coupled to the lever (5) and an opposed end now coupled to the terminal member (2) via an electrically insulative element (7) located in series between the biasing member (4) and the terminal member (2). The electrically insulative element (7) may for instance be formed from an electrically-insulative plastic material having suitable structural strength and the ability to withstand repetitive moment forces, in addition to having electrically insulative properties. It would be appreciated that other suitable insulative materials may also be utilised in other embodiments including for instance glass fiber nylon, ABS and the like. Advantageously, the biasing member (4) is now electrically-isolated when the electrical switch unit is arranged in the ON position and there is no longer any secondary current path available through the biasing member (4). Accordingly, the current capability of the electrical power tool is now increased due to the electrical switching unit no longer being constrained by the current loading capacity of the biasing member (4).

The electrically insulative element (7) in this embodiment is configured to protrude outwardly from the terminal member (2) as shown in FIG. 4 although it need not necessarily need to protrude away from the terminal member (2) in other embodiments and may for instance lie relatively flat against the surface of the terminal member (2). However, if the electrically insulative element (7) is of a protruding nature, this may assist in suitably spacing the end of the biasing member (4) away from the terminal member (2) so as to allow for smoother linear motion of the biasing member (4) along its linear axis as it expands and contracts. Also, whilst the electrically insulative element (7) is depicted as being L-shaped in this exemplary embodiment, the electrically insulative element may be formed in any other suitable shape configurations in alternate embodiments without departing from the spirit of the invention.

The electrically insulative element (7) and the terminal member (2) are pre-assembled together, for instance as a co-moulded component. This provides generally easier, better and faster fitting of the electrically insulative element (7) and the terminal member (2) in to position within the switchbox housing during the manufacturing process compared to when such parts are formed separately. This also results in greater precision in terms of the dimensions and positioning of the preassembled parts relative to each other, and relative to other parts in the switching unit assembly; this alleviates calibration and alignment problems of such component parts during the manufacturing process; and, it makes it easier to perform pre-testing of the preassembled part.

In alternative embodiments, it is possible for the biasing member (4) to be electrically isolated in the electrical switch unit using any number of different configurations instead of locating the electrically insulative element (7) in series between the biasing member (4) and the terminal member (2). For instance, it is possible that the biasing member (4) may be connected to the lever (5) via an intermediate electrically insulative material disposed between the end of the biasing member (4) and the lever (5) instead.

Figure 6:
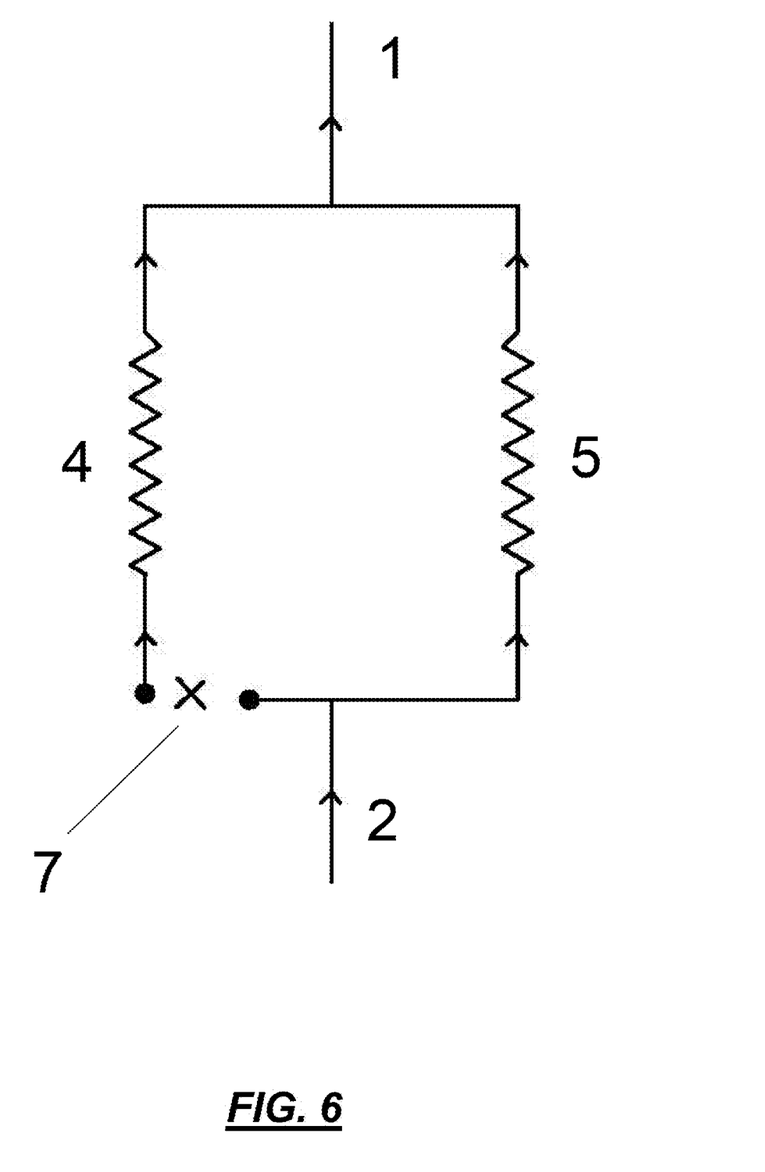
FIG. 6 depicts an electrical circuit representation of the novel electrical switch embodiment depicted in FIG. 4.

FIG. 6 depicts a circuit diagram representation of the novel switch unit embodiment of the present invention discussed above in which the primary current path includes the terminal member (2), the lever (5) and the movable electrical contact (1) whilst the secondary current path now no longer exists due to the use of the electrically insulative element (7) located between the biasing member (4) and the terminal member (2) which serves to electrically isolate the biasing member (4) from current flow when the switch is in an ON state. The "X" symbol in the circuit diagram symbolizes and open circuit even in the circuit diagram by virtue of the electrically insulative element (7).

It will be apparent from the preceding embodiments that various advantages may be provided by embodiments of the present invention over existing technologies namely:

(i) the electrical isolation of the biasing member (4) in the electrical switch unit by virtue of the inclusion of the electrically insulative element (7) conveniently alleviates the electrical current constraint associated with conventional electrical switch units (due to the biasing member forming the secondary current path). Accordingly, the electrical switch unit in embodiments of the present invention may now enjoy a relatively higher current capability and thereby allow for electrical devices having higher power capability.

(ii) the novel solution of isolating the biasing member (4) from secondary electrical current flow in the electrical switch unit alleviates the need to implement other solutions such as increasing the size/dimensions (and resistance) of the biasing member (4) in the electrical switch unit in order to accommodate higher current loading. In certain electrical devices, such as hand-held power tools, it may not be practicable to simply increase the size/dimensions of the coil spring in the electrical switch unit due to the size constraints of such power tools which are becoming increasingly compact. Also increasing the size of the coil spring in the electrical switch unit would necessitate a corresponding increase in size of the actuation spring in the actuator mechanism to actuate the electrical switch unit, which further exacerbates the limited space problem;

(iii) as the electrically insulative element (7) and the terminal member (2) are preassembled tougher, this alleviates time and difficulty associated with installation, calibration and testing of such parts during the manufacturing process which arises when installing such parts separately; and (iv) as the terminal member (2) is now arranged directly in electrical communication with the lever (5) in the primary current flow path, this eliminates one additional link in the primary current path of the switch unit which, and thus eliminates one additional potential point of electrical/mechanical failure during operation.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed is:

1. An electrical switch unit for use in an electrical device to control flow of electrical current therethrough from a power source to power the electrical device, the electrical switch unit comprising:
   a fixed electrical contact and a movable electrical contact, said movable electrical contact being configured for movement relative to the fixed electrical contact between an ON position in which the movable electrical contact is in contact with the fixed electrical contact wherein electrical current is able to flow from the power source therethrough to power the electrical device, and, an OFF position in which the movable electrical contact is out of contact with the fixed electrical contact wherein electrical current from the power source is not able to flow from the power source therethrough to power the electrical device;
   a contact mover movably coupled to a terminal member, the contact mover being configured for movement relative to the terminal member so as to move the movable electrical contact between the ON position and the OFF position; and
   a biasing member coupling the contact mover and the terminal member together such that said biasing member is configured to act upon the contact mover as the contact mover moves the movable electrical contact relative to the fixed electrical contact between the ON position and the OFF position;
   wherein when the movable electrical contact is arranged in the ON position, electrical current is able to flow along an electrical current path comprising the terminal member, the contact mover and the movable electrical contact in series, and, wherein an electrical insulation member is arranged in series with the biasing member between the contact mover and the terminal member whereby said electrical insulation member electrically insulates the biasing member from electrical current flow therethrough when the movable electrical contact is arranged in the ON position.

2. An electrical switch unit as claimed in claim 1 wherein the electrical insulation member includes an electrically-insulative material comprising at least one of a glass fibre nylon material or a ceramic material.

3. An electrical switch unit as claimed in claim 1 wherein the biasing member includes an elastic biasing member.

4. An electrical switch unit as claimed in claim 3 wherein the elastic biasing member includes at least one of a compression coil spring, a tension coil spring and a torsion coil spring.

5. An electrical switch unit as claimed in claim 1 wherein a first end of the biasing member is coupled to the contact mover and a second end of the biasing member is coupled to the terminal member via the electrical insulation member.

6. An electrical switch unit as claimed in claim 1 wherein the electrical insulation member is configured to protrude from the terminal member.

7. An electrical switch unit as claimed in claim 1 wherein the contact mover includes a lever that is pivotably movable relative to the terminal member.

8. An electrical switch unit as claimed in claim 1 wherein the movable electrical contact includes a copper alloy material.

9. An electrical switch unit as claimed in claim 1 including a plurality of movable electrical contact members that are movable by at least one contact mover between ON positions and OFF positions.

10. An electrical switch unit as claimed in claim 1 including an operable actuator mechanism for actuating movement of the contact mover relative to the terminal member.

11. An electrical switch unit as claimed in claim 1 wherein the electrical insulation member and the terminal member are pre-assembled together.

12. An electrical switch unit as claimed in claim 11 wherein the electrical insulation member and the terminal member are co-molded together.

13. An electrical device comprising an electrical switch unit in accordance with claim 1.

14. An electrical device as claimed in claim 13 including at least one of an electrical power tool and an electrical gardening tool.

* * * * *